March 22, 1932.   C. J. ROBINSON   1,850,415
INSPECTION APPARATUS
Filed Aug. 19, 1929   2 Sheets-Sheet 1
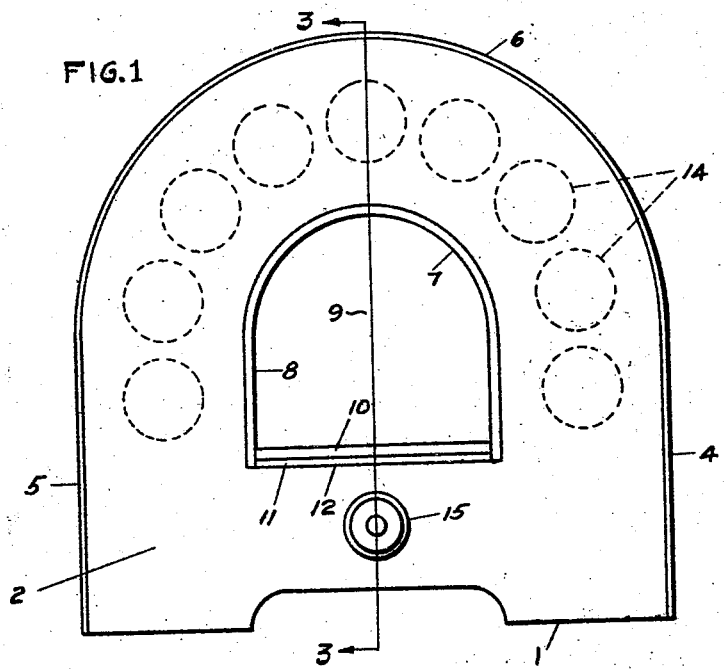
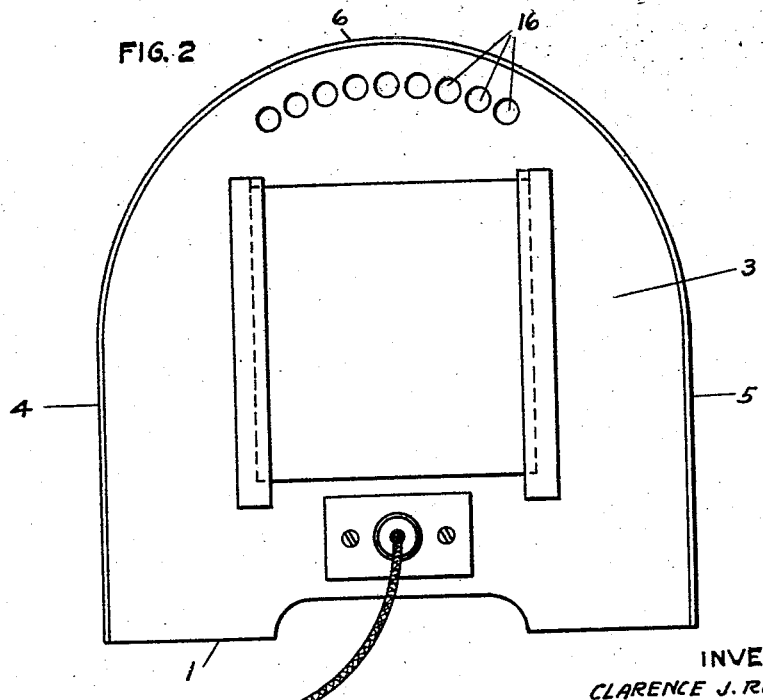
INVENTOR
CLARENCE J. ROBINSON.
BY *Toulmin & Toulmin*
ATTORNEYS March 22, 1932.  C. J. ROBINSON  1,850,415
INSPECTION APPARATUS
Filed Aug. 19, 1929  2 Sheets-Sheet 2
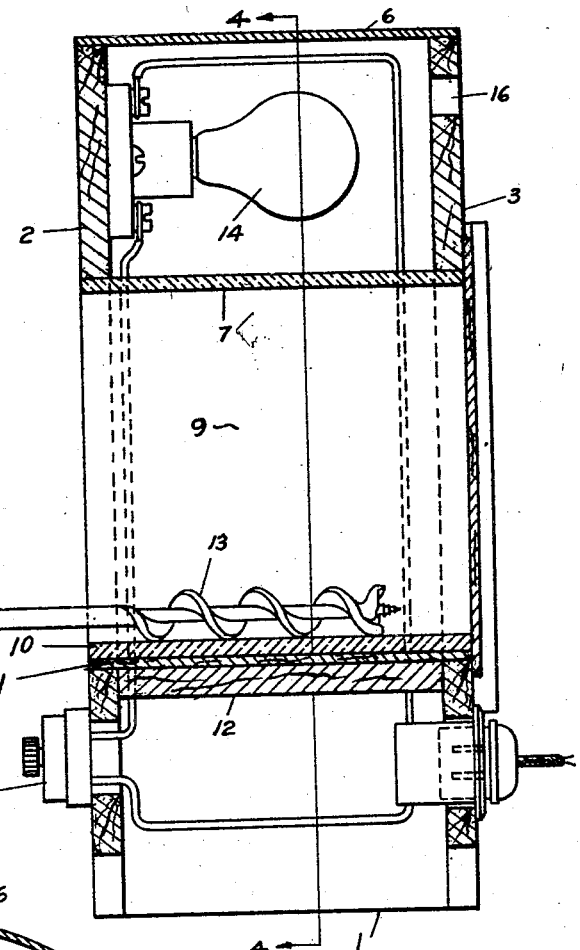
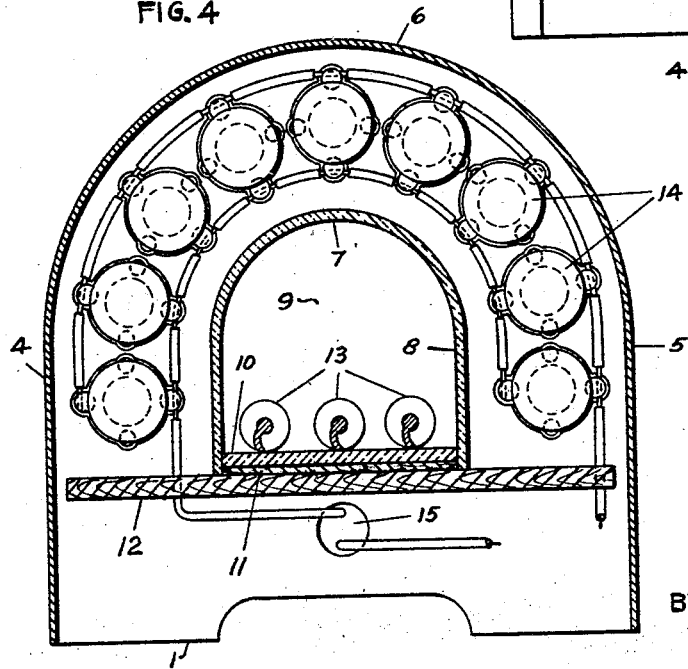
INVENTOR
CLARENCE J. ROBINSON.
BY Toulmin & Toulmin
ATTORNEYS Patented Mar. 22, 1932

1,850,415

UNITED STATES PATENT OFFICE

CLARENCE J. ROBINSON, OF WILMINGTON, OHIO, ASSIGNOR TO THE IRWIN AUGER BIT COMPANY, OF WILMINGTON, OHIO, A CORPORATION OF OHIO

INSPECTION APPARATUS

Application filed August 19, 1929. Serial No. 387,038.

This invention relates to inspection apparatus.

It is an object of my invention to provide an inspection apparatus which will provide means of inspecting the finish or color of manufactured products and the like without the interference of natural light or the variations customary in artificial light.

It is an object of my invention to provide a definite source of illumination from all directions in a chamber in which the article can be located and observed in order that a constant standard of inspection under a constant light source will enable rigid standards of inspection to be maintained as to the finish of the manufactured articles.

My invention is particularly adapted for the inspection of highly polished metal articles, such as auger bits, having a large number of curved surfaces which must be highly polished without scratches to prevent subsequent rusting. Heretofore such inspection under natural light or combined artificial and natural light has not been possible due to an irregular source of illumination and, therefore, no standard of comparison and checking has been possible.

Referring to the drawings:—

Fig. 1 is a front elevation of my apparatus;
Fig. 2 is a rear elevation thereof;
Fig. 3 is a section on the line 3—3 of Fig. 1;
Fig. 4 is a section on the line 4—4 of Fig. 3.

Referring to the drawings in detail, 1 is the bottom of a housing which is provided with a front wall 2 and a rear wall 3. The housing is provided with side walls 4 and 5 that merge together to an arcuate top wall 6. The front wall 2 is provided with a cut-away opening having an arch-shaped top 7 and side walls 8 formed of a translucent material, such as tracing cloth, ground glass, or the like. The bottom of this recess chamber 9 is provided with a glass support 10 having a light reflecting surface of white paper or other material 11 beneath it where it is supported on the bottom 12. The articles 13, such as auger bits, are laid on this glass 10 for inspection within the chamber 9.

The rear wall of this chamber 9 is formed by the rear wall of the housing designated 3.

Around this interior chamber 9 for directing light through its translucent side walls 8 and top 7 are a series of light bulbs 14 which are connected by suitable wires to the external switch 15. Ventilation openings to remove the heat from such lamps are provided at 16 in the rear wall 3.

Thus I provide a chamber in which the light directed is of the same quality and equidistantly spaced in all directions while the article remains upon a light reflecting surface where it may be rotated and inspected for defects without the interference of natural light or other artificial light. Hence under the standard source of diffused illumination a standard of comparison and inspection may be maintained in inspecting such articles.

It will be understood that my invention applies to any type of article.

It will be understood that I desire to comprehend within my invention and within the scope of my claims such modifications as may be fairly comprehended within such claims and invention due to necessary modifications to adapt my invention to varying conditions of use and to varying purposes.

Having thus fully described my invention, what I claim as new and desire to secure by Letters Patent, is:

1. In an inspection apparatus, a chamber having opaque exterior walls and light transmitting interior walls forming an inspection chamber therein, illumination means between said exterior and interior walls for illuminating the inspection chamber and a light reflecting bottom for said inspection chamber.

2. In an inspection apparatus, a box having a flat bottom and an arcuate top, a chamber formed within said box having a flat bottom and an arcuate top, sources of illumination spaced between the top of the box and the top of the chamber, said chamber having a light transmitting top for communicating light from the box to the interior of the chamber.

3. In an inspection apparatus, a box having a flat bottom and an arcuate top, a chamber formed within said box having a flat bottom and an arcuate top, sources of illumination spaced between the top of the box and the top of the chamber, said chamber having a light transmitting top for communicating light from the box to the interior of the chamber, the top of said chamber being formed of a translucent material so that the light transmitted is diffused and of uniform character.

4. In an inspection apparatus, a box having a flat bottom and an arcuate top, a plurality of lamps mounted on one wall of said box beneath the top at spaced points in an arcuate path, a translucent wall within said box equidistantly spaced from said lights and a bottom in the box cooperating with the translucent wall to form an inspection chamber, said lights being so enclosed that the light therefrom can only pass through the walls of the inspection chamber.

5. In an inspection apparatus, a box having a flat bottom and an arcuate top, a plurality of lamps mounted on one wall of said box beneath the top at spaced points in an arcuate path, a translucent wall within said box equidistantly spaced from said lights, a bottom in said box cooperating with the translucent wall to form an inspection chamber, said lights being so enclosed that the light therefrom can only pass through the walls of the inspection chamber, and means for ventilating the box enclosure containing the lights.

6. In an inspection apparatus, an inspection chamber having translucent side walls and top and a light-reflecting bottom composed of a sheet of white paper and a glass over the paper, an opaque inclosure around the sides and top of said chamber forming a light chamber, and illuminating means in said light chamber.

7. In an inspection apparatus, an inspection chamber having translucent side walls and top, said top being arcuate, and a light-reflecting bottom, said bottom being composed of an opaque lower member, a sheet of white paper on the lower member and glass over the paper, an opaque inclosure around the sides and the top of said chamber forming a light chamber, and illuminating means in said light chamber.

In testimony whereof, I affix my signature.

CLARENCE J. ROBINSON.